United States Patent
Asai

(10) Patent No.: US 9,944,324 B2
(45) Date of Patent: Apr. 17, 2018

(54) VEHICLE FRAME STRUCTURE

(71) Applicant: TOYOTA JIDOSHA KABUSHIKI KAISHA, Toyota-shi (JP)

(72) Inventor: Tetsuya Asai, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/171,456

(22) Filed: Jun. 2, 2016

(65) Prior Publication Data
US 2017/0036699 A1 Feb. 9, 2017

(30) Foreign Application Priority Data

Aug. 6, 2015 (JP) .................. 2015-155929

(51) Int. Cl.
*B62D 21/15* (2006.01)
*B60R 19/18* (2006.01)
*B62D 25/08* (2006.01)

(52) U.S. Cl.
CPC ......... *B62D 21/152* (2013.01); *B62D 25/082* (2013.01); *B60R 2019/1806* (2013.01)

(58) Field of Classification Search
CPC .... B62D 21/152; B62D 25/082; B60R 19/18; B60R 2019/1806
See application file for complete search history.

(56) References Cited

U.S. PATENT DOCUMENTS 8,596,711 B2 * 12/2013 Yasui ............... B60R 19/34
296/187.09
8,991,903 B1 * 3/2015 Alavandi ............... B60R 19/04
293/133

FOREIGN PATENT DOCUMENTS

| JP | 2008-213739 | 9/2006 |
| JP | 2012-228907 | 11/2012 |
| JP | 2014-113694 A | 6/2014 |
| JP | 2014-162347 A | 9/2014 |

* cited by examiner

*Primary Examiner* — D Glenn Dayoan
*Assistant Examiner* — Melissa A Black
(74) *Attorney, Agent, or Firm* — Oblon, McClelland, Maier & Neustadt, L.L.P.

(57) ABSTRACT

The present invention provides a vehicle frame structure including: a pair of right and left side rails; a cross member that bridges the side rails in the vehicle width direction; a bumper reinforcement that is placed on the front side of the side rails; load bearing portions that are disposed at vehicle width direction outer side surfaces of the side rails; curved portions that are disposed in the bumper reinforcement, curve toward the vehicle rear side heading outward in the vehicle width direction in sections of the bumper reinforcement at the vehicle width direction outer sides of the side rails; and projecting portions that are secured to rear surfaces of the curved portions of the bumper reinforcement, that project toward the vehicle rear side, that are placed with gaps between them and the load bearing portions.

5 Claims, 8 Drawing Sheets

VEHICLE FRAME STRUCTURE

CROSS-REFERENCE TO RELATED APPLICATION

This application is based on and claims the benefit of priority of Japanese Patent Application No. 2015-155929, filed on Aug. 6, 2015, the entire contents of which are incorporated herein by reference.

BACKGROUND

Technical Field

The embodiments discussed herein are related to a vehicle frame structure.

Related Art

Japanese Patent Application Laid-open (JP-A) No. 2008-213739 discloses a bumper structure equipped with extension portions that extend in a vehicle rearward direction from vehicle width direction outsides of a bumper reinforcement. Stoppers are disposed on vehicle width direction outsides of side members that support the bumper reinforcement. In this bumper structure, at the time of a so-called small overlap crash where a load from the vehicle front side is input to the vehicle width direction outside of one of the side members, the corresponding extension portion rotates inward in the vehicle width direction, the extension portion and the stopper come into contact with each other, and the crash energy is absorbed. Furthermore, at the time of a normal crash in which a load is input to the vehicle width direction inside of the side members, the extension portions virtually do not rotate inward in the vehicle width direction, so the extension portions and the stoppers are kept from interfering with each other and the crash energy is absorbed by the side members. It should be noted that examples of structures that absorb crash energy at the time of a small overlap crash where a load is input to the vehicle width direction outside of one of the side members include the structure disclosed in JP-A No. 2012-228907.

The structure disclosed in JP-A No. 2008-213739 has room for improvement in order to efficiently transmit the load at the time of a small overlap crash.

SUMMARY OF THE INVENTION

In consideration of the circumstances described above, it is an object of the present invention to obtain a vehicle frame structure which, in a case where a load has been input to the bumper reinforcement at the vehicle width direction outer sides of the side rails, can efficiently transmit the load.

A vehicle frame structure of a first aspect includes: a pair of right and left side rails that are placed at vehicle width direction outer sides and extend along a vehicle front and rear direction; a cross member that bridges vehicle front portion sides of the pair of right and left side rails in a vehicle width direction; a bumper reinforcement that is placed at a vehicle front and rear direction front side of the side rails and extends in the vehicle width direction; load bearing portions that are disposed at vehicle width direction outer side surfaces of the side rails in joint sections between the side rails and the cross member; curved portions that are disposed at the bumper reinforcement, that curve toward a vehicle rear side heading outward in the vehicle width direction in sections of the bumper reinforcement at the vehicle width direction outer sides of the side rails, and that have a shape which, in a case in which a load from a vehicle front end portion has been input to a section of the bumper reinforcement at a vehicle width direction inner side of the side rails, opens toward a vehicle front end portion side; and projecting portions that are secured to rear surfaces of the curved portions of the bumper reinforcement, that project toward the vehicle rear side, that are placed with gaps between them and the load bearing portions, and that are configured such that, in a case in which a load from the vehicle front end portion has been input to one of the curved portions at the vehicle width direction outer side of the corresponding side rail, the projecting portion at the side of the one of the curved portion engages with the corresponding load bearing portion.

According to the vehicle frame structure of the first aspect, the cross member bridges in the vehicle width direction the vehicle front portion sides of the pair of right and left side rails that extend along the vehicle front and rear direction at the vehicle width direction outer sides. The load bearing portions are disposed at the vehicle width direction outer side surfaces of the side rails in the joint sections between the side rails and the cross member. The bumper reinforcement that extends in the vehicle width direction is placed on the vehicle front and rear direction front side of the side rails. The curved portions that curve toward the vehicle rear side heading outward in the vehicle width direction in sections of the bumper reinforcement at the vehicle width direction outer sides of the side rails are disposed at the bumper reinforcement. The projecting portions are secured to the rear surfaces of the curved portions of the bumper reinforcement, project toward the vehicle rear side, and are placed with gaps between them and the load bearing portions. Because of this, in the case of a crash (sometimes called a "small overlap crash" below) where a load from the vehicle front end portion is input to one of the curved portions at the vehicle width direction outer sides of the side rails, the projecting portion secured to the rear surface of that curved portion engages with the corresponding load bearing portion, and the load is efficiently transmitted from the corresponding side rail via the cross member to the opposite side in the vehicle width direction.

Furthermore, in the case of a crash (e.g., a full overlap crash, a crash offset toward either the right side or the left side of the vehicle) where a load from the vehicle front end portion is input to the section of the bumper reinforcement at the vehicle width direction inner side of the side rails, the projecting portions and the load bearing portions do not interfere with each other because the curved portions open toward the vehicle front end portion side, so the load is absorbed by the vehicle front portion sides of the side rails. Because of this, a balance in crash performance can be achieved between a case where a load from the vehicle front end portion is input to one of the curved portions at the vehicle width direction outer sides of the side rails and a case where a load from the vehicle front end portion is input to the section of the bumper reinforcement at the vehicle width direction inner side of the side rails.

A vehicle frame structure of a second aspect is the vehicle frame structure according to the first aspect, wherein the load bearing portions are recessed portions that are recessed inward in the vehicle width direction from vehicle width direction outer side wall portions of the side rails.

According to the vehicle frame structure of the second aspect, the load bearing portions are recessed portions that are recessed inward in the vehicle width direction from the vehicle width direction outer side wall portions of the side rails. Because of this, in a case a load is input to one of the curved portions at the vehicle width direction outer sides of the side rails (in the case of a small overlap crash), the distal end of the projecting portion on the crash side becomes engaged with the corresponding recessed portion. For this reason, the load is easily transmitted to the vehicle rear side of the side rail on the crash side and is easily transmitted from that side rail via the cross member to the opposite side in the vehicle width direction. Furthermore, the load bearing portions do not project outward in the vehicle width direction from the wall portions, so they can be kept from affecting the rotational track of the wheels in the vehicle width direction as seen in a vehicle plan view.

A vehicle frame structure of a third aspect is the vehicle frame structure according to the first aspect, wherein the load bearing portions are equipped with raised portions that project outward in the vehicle width direction from vehicle width direction outer side wall portions of the side rails.

According to the vehicle frame structure of the third aspect, the load bearing portions are equipped with the raised portions that project outward in the vehicle width direction from the vehicle width direction outer side wall portions of the side rails. Because of this, in a case where a load is input to one of the curved portions at the vehicle width direction outer sides of the side rails (in the case of a small overlap crash), the distal end of the corresponding projecting portion becomes engaged with the wall portion of the corresponding side rail and the corresponding raised portion. For this reason, the load is easily transmitted to the vehicle rear side of the side rail on the crash side and is easily transmitted from that side rail via the cross member to the opposite side in the vehicle width direction.

A vehicle frame structure according to a fourth aspect is the vehicle frame structure according to the first aspect, wherein reinforcement members interposed between the load bearing portions and the cross member are disposed inside the side rails.

According to the vehicle frame structure of the fourth aspect, the reinforcement members interposed (placed) between the load bearing portions and the cross member are disposed inside the side rails. Because of this, in a case where a load has been input to one of the curved portions at the vehicle width direction outer sides of the side rails (in the case of a small overlap crash), the load is transmitted from the load bearing portion on the crash side by the corresponding reinforcement member to the cross member. For this reason, the load from the projecting portion is efficiently transmitted to the opposite side in the vehicle width direction.

A vehicle frame structure according to a fifth aspect is the vehicle frame structure according to the fourth aspect, wherein the reinforcement members are joined to side rail inner members configuring vehicle width direction inner side sections of the side rails.

According to the vehicle frame structure of the fifth aspect, the reinforcement members are joined to the side rail inner members configuring vehicle width direction inner side sections of the side rails. Because of this, in a case where a load has been input to one of the curved portions at the vehicle width direction outer sides of the side rails (in the case of a small overlap crash), the load is transmitted from the corresponding load bearing portion via the reinforcement member joined to the corresponding side rail inner member to the cross member.

Additionally, according to the vehicle frame structure of the first aspect, in a case where a load has been input to the bumper reinforcement at the vehicle width direction outer sides of the side rails, the load can be efficiently transmitted.

DETAILED DESCRIPTION OF THE INVENTION

Figure 1:
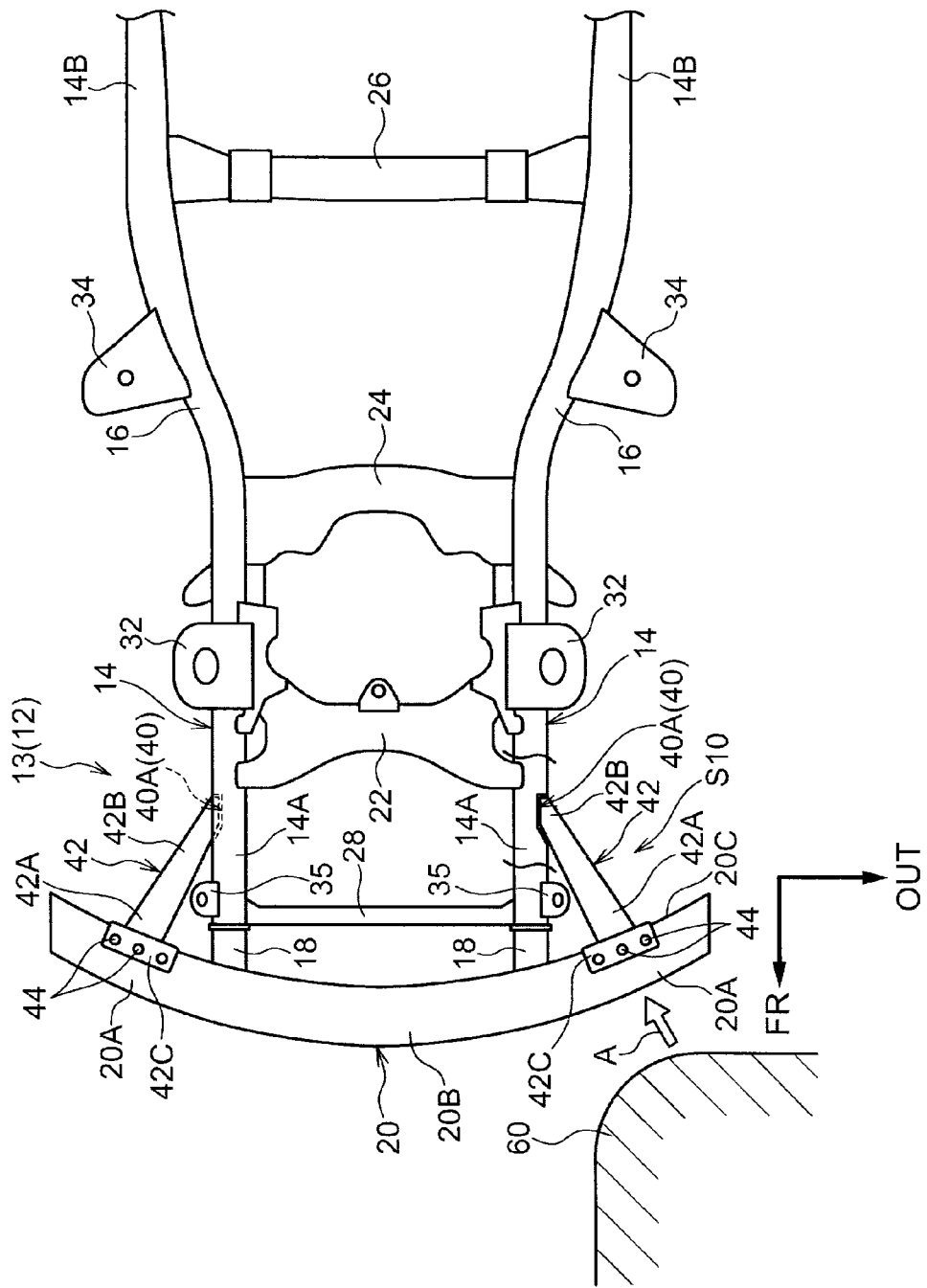
FIG. 1 is a plan view showing a vehicle frame structure pertaining to a first embodiment.

Embodiments of a vehicle frame structure of the present invention will be described below on the basis of the drawings. It should be noted that arrow FR appropriately shown in the drawings indicates a vehicle forward direction, arrow UP indicates a vehicle upward direction, and arrow OUT indicates an outward direction in a vehicle width direction. Furthermore, in cases where the directions of front and rear, up and down, and right and left are used without further specification in the following description, these will be understood to mean front and rear in the vehicle front and rear direction, up and down in the vehicle up and down direction, and right and left in the vehicle right and left direction (the vehicle width direction).

A vehicle frame structure S10 pertaining to a first embodiment of the present invention will now be described using FIG. 1 to FIG. 6.

FIG. 1 is a plan view showing a front portion 13 of a vehicle (framed vehicle) 12 to which the vehicle frame structure S10 pertaining to the present embodiment has been applied. As shown in FIG. 1, a pair of right and left side rails 14 that extend along the vehicle front and rear direction on both vehicle width direction sides are disposed in the front portion 13 of the vehicle 12. Front wheels (not shown in the drawings) are disposed on the vehicle width direction outsides of front portion 14A sides of the side rails 14. For this reason, in consideration of interference with the front wheels, the vehicle width direction distance between the front portion 14A sides of the side rails 14 is set shorter than the vehicle width direction distance between middle portion 14B sides positioned in the vehicle front and rear direction middle sections of the side rails 14.

Bent portions 16 that are bent outward in the vehicle width direction heading from the vehicle front side of the side rails 14 toward the vehicle rear side are disposed between the vehicle front and rear direction front portions 14A and middle portions 14B of the side rails 14. Additionally, the front portions 14A and the middle portions 14B of the side rails 14 are connected to each other by the bent portions 16. It should be noted that the front portions 14A of the side rails 14 are placed on the vehicle upper side of the middle portions 14B in consideration of the placement of suspension units. For this reason, the front portions 14A of the side rails 14 project in the vehicle upward direction in the vehicle front and rear direction middle sections, and the bent portions 16 slope downward heading from the front portions 14A of the side rails 14 toward the vehicle rear side.

Crash boxes 18 for absorbing energy at the time of a crash are disposed on the front sides of the front portions 14A of the pair of right and left side rails 14. A bumper reinforcement (front bumper reinforcement) 20 bridges the front end portions of the pair of right and left crash boxes 18 along the vehicle width direction. In other words, in the vehicle frame structure S10, the bumper reinforcement 20 that extends in the vehicle width direction is disposed on the vehicle front and rear direction front side of the front portions 14A of the pair of right and left side rails 14. It should be noted that the vehicle 12 may also be given a configuration that does not have the crash boxes 18 disposed between the front end portions of the side rails 14 and the bumper reinforcement 20, so that the bumper reinforcement 20 bridges the front end portions of the pair of right and left side rails 14. That is, the vehicle frame structure of the present invention includes both a structure where the crash boxes 18 are disposed between the front portions 14A of the side rails 14 and the bumper reinforcement 20 and a structure where the crash boxes 18 are not disposed.

The bumper reinforcement 20 is equipped with curved portions 20A that curve toward the vehicle rear side heading outward in the vehicle width direction in sections of the bumper reinforcement 20 at the vehicle width direction outer sides of the side rails 14. That is, the bumper reinforcement 20 has a configuration where the curved portions 20A on the vehicle width direction outsides curve toward the vehicle rear side heading outward in the vehicle width direction with respect to a vehicle width direction middle portion 20B. Although this will be described in detail later, the vehicle frame structure S10 of the present embodiment has a configuration where, in the case of a frontal crash (e.g., a full overlap crash or an offset crash) where a load from the vehicle front end portion is input to the section of the bumper reinforcement 20 at the vehicle width direction inner side of the side rails 14, the curved portions 20A open toward the vehicle front end portion side (see FIG. 6).

On the vehicle rear side of the bumper reinforcement 20, plural cross members 22, 24, and 26 extend along the vehicle width direction between the pair of right and left side rails 14. That is, the plural cross members 22, 24, and 26 bridge the pair of right and left side rails 14 in the vehicle width direction in this order from the vehicle front side. Because of this, a ladder-shaped frame is configured in the front portion 13 of the vehicle 12 of the present embodiment. It should be noted that the cross member 22 and the cross member 24 bridge the front portions 14A of the side rails 14 and that the cross member 26 bridges the sections of the side rails 14 where the bent portions 16 and the middle portions 14B are connected to each other. A front side coupling portion 28 bridges the front end portions of the side rails 14 in the vehicle width direction on the vehicle front and rear direction front side of the cross member 22. FIG. 1 shows only the front portions 14A and part of the middle portions 14B of the side rails 14, but on the rear side of this also, cross members bridge the side rails 14.

The vehicle (framed vehicle) 12 has a structure that is different from that of a unibody car (a monocoque car), in which the cabin and the skeleton are integrally configured.

Suspension mount brackets 32 made of metal that project outward in the vehicle width direction from the side rails 14 are disposed in the sections of the front portions 14A of the side rails 14 between the cross member 22 and the cross member 24. Suspension mounts (not shown in the drawings) are attached to the suspension mount brackets 32, and suspension units can be coupled to the side rails 14 via the suspension mounts and the suspension mount brackets 32.

Furthermore, cab mount brackets 34 are disposed on the bent portions 16 of the side rails 14. The cab mount brackets 34 project outward in the vehicle width direction from the bent portions 16, and cab mounts (not shown in the drawings) are attached to the cab mount brackets 34. Additionally, a cab (body; not shown in the drawings) can be coupled to the side rails 14 via the cab mounts and the cab mount brackets 34. Furthermore, cab mount brackets 35 that project outward in the vehicle width direction from the side rails 14 are disposed on the front end portion sides of the front portions 14A of the side rails 14. The cab (body; not shown in the drawings) can be coupled to the side rails 14 by the cab mount brackets 35.

Figure 3:
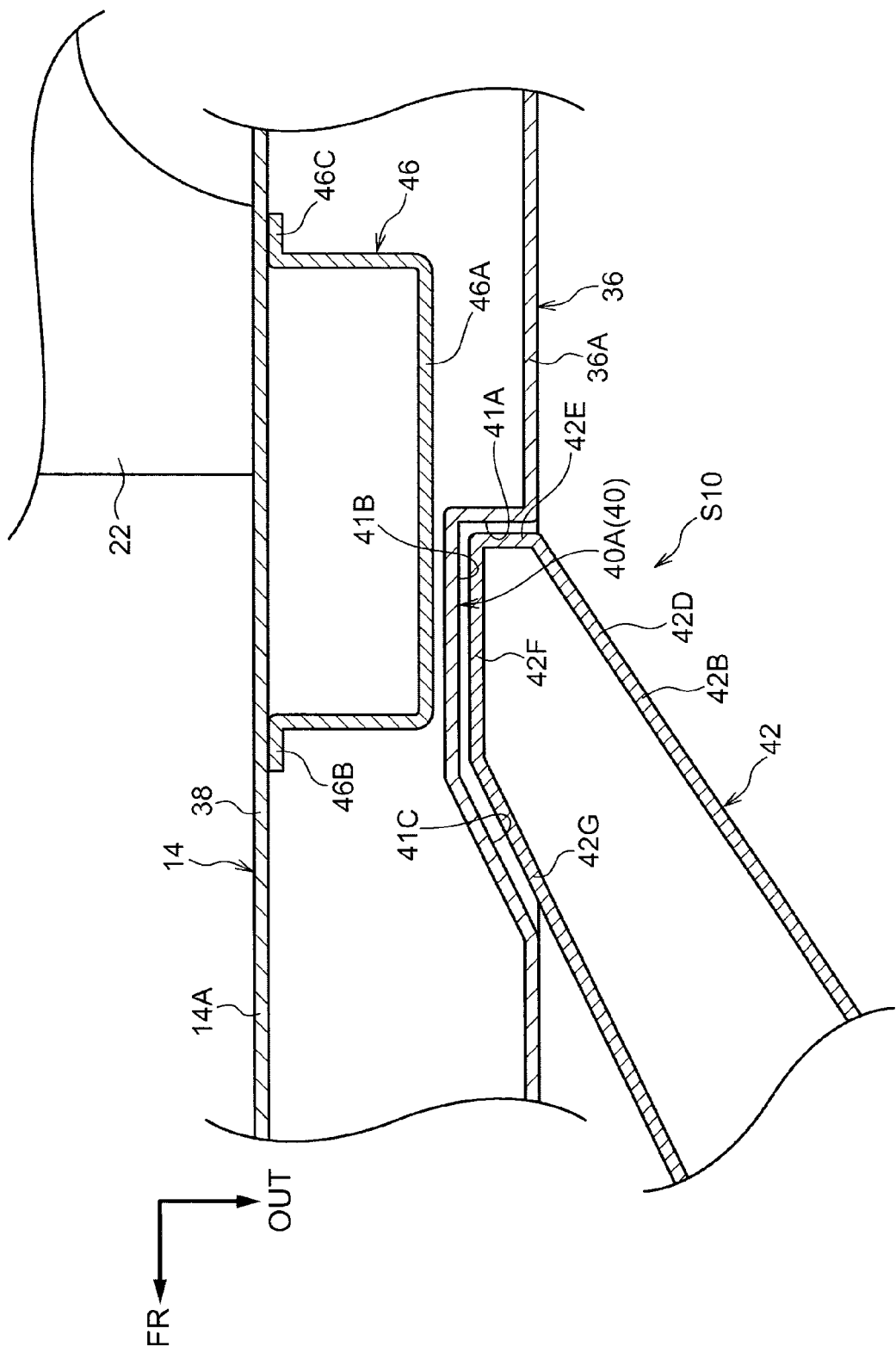
FIG. 3 is a plan sectional view showing the configuration of the area around a gap between a brace and a load bearing portion of a side rail disposed in the vehicle frame structure shown in FIG. 1.

As shown in FIG. 3, the side rails 14 are each equipped with a side rail outer member 36, which configures the vehicle width direction outside section of the side rail 14, and a side rail inner member 38, which is placed on the vehicle width direction inside of the side rail outer member 36 and configures the vehicle width direction inside section of the side rail 14. The side rail outer member 36 and the side rail inner member 38 are made of steel. Although it is not shown in the drawings, the cross-sectional shape of the side rail outer member 36 when cut along the vehicle width direction is a substantially U-shape that opens inward in the vehicle width direction. Furthermore, the cross-sectional shape of the side rail inner member 38 when cut along the vehicle width direction is a substantially U-shape that opens outward in the vehicle width direction. Additionally, the upper wall of the side rail outer member 36 and the upper wall of the side rail inner member 38 are laid on top of, and joined to, each other in the up and down direction, and the lower wall of the side rail outer member 36 and the lower wall of the side rail inner member 38 are laid on top of, and joined to, each other in the up and down direction. Because of this, the side rails 14 each have a substantially rectangular closed cross-sectional structure.

Figure 2:
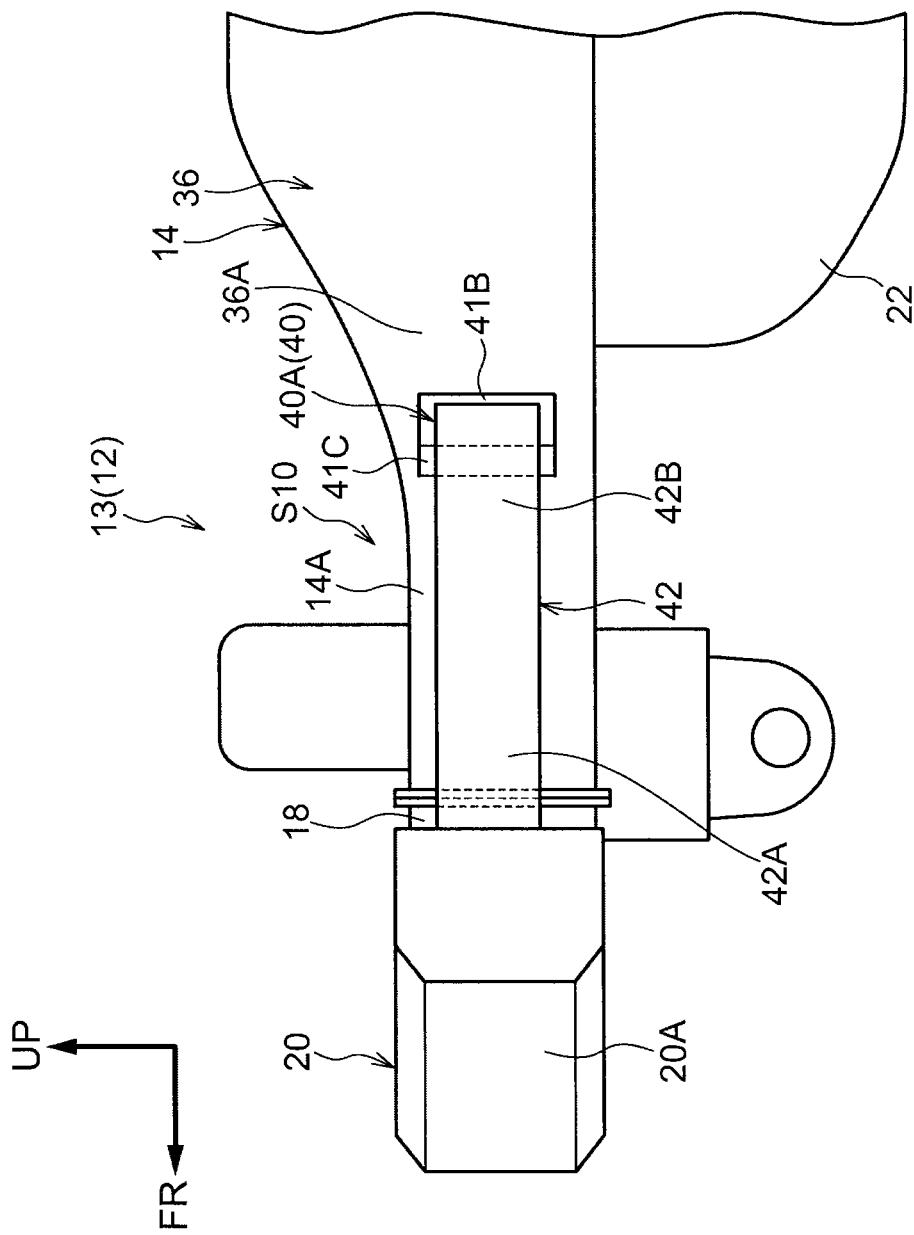
FIG. 2 is a side view showing the vehicle frame structure shown in FIG. 1 in a state in which it seen from the width direction right side of the vehicle front.

As shown in FIG. 1 to FIG. 3, the vehicle frame structure S10 is equipped with load bearing portions 40, which are disposed at the vehicle width direction outer side surfaces of the side rails 14 in the joint sections between the side rails 14 and the front side cross member 22, and braces 42, which serve as projecting portions that are secured to rear surfaces 20C of the curved portions 20A of the bumper reinforcement 20. In the present embodiment, the vehicle frame structure S10 is configured to be bilaterally symmetrical on both width direction sides of the vehicle 12.

The load bearing portions 40 are disposed in the side rail outer members 36 configuring the vehicle width direction outside surfaces of the side rails 14 (see FIG. 2 and FIG. 3). The load bearing portions 40 are configured by recessed portions 40A that are recessed inward in the vehicle width direction from vertical wall portions 36A serving as wall portions placed along the substantially vehicle up and down direction and the vehicle front and rear direction on the vehicle width direction outsides of the side rail outer members 36.

As shown in FIG. 3, as seen in a plan sectional view, the recessed portions 40A are each equipped with a rear side wall portion 41A that is placed on the vehicle front and rear direction rear side and is bent inward in the vehicle width direction from the vertical wall portion 36A, a bottom wall portion 41B that extends toward the vehicle front side from the vehicle width direction inside end portion of the rear side wall portion 41A, and a sloping portion 41C that slopes toward the vehicle front side and outward in the vehicle width direction from the front end portion of the bottom wall portion 41B.

As shown in FIG. 1, the braces 42 are secured to the rear surfaces 20C of the curved portions 20A of the bumper reinforcement 20 and project toward the load bearing portions 40 on the substantially vehicle rear side (see FIG. 2 and FIG. 3). More specifically, front end portions 42A of the braces 42 are secured to the rear surfaces 20C of the curved portions 20A, and rear end portions 42B serving as distal ends of the braces 42 are placed with a gap between them and the load bearing portions 40, so that the braces 42 have a cantilever structure. As seen in a vehicle plan view, the braces 42 are placed in oblique directions heading toward the vehicle rear side and inward in the vehicle width direction from the rear surfaces 20C of the curved portions 20A. That is, the braces 42 are placed in directions intersecting the axial directions of the side rails 14.

The braces 42 each have a closed cross-sectional structure whose cross-sectional shape when cut along the vehicle width direction is substantially rectangular. It should be noted that the braces 42 are not limited to having a substantially rectangular cross-sectional shape and, for example, may also have a substantially U-shaped cross-sectional shape that opens inward in the vehicle width direction. The braces 42 each have a shape whose vehicle width direction dimension gradually becomes smaller heading from the front end portions 42A toward the rear end portions 42B as seen in a vehicle plan view. The vehicle up and down direction dimensions of the braces 42 are set to be substantially the same heading from the front end portions 42A toward the rear end portions 42B as seen in a vehicle side view (see FIG. 2).

As shown in FIG. 1, extension portions 42C that extend toward the curved portion 20A sides of the bumper reinforcement 20 and are laid on top of the upper walls of the curved portions 20A are disposed on the front end portions 42A of the braces 42. The extension portions 42C are joined by plural rivets 44 to the upper walls of the curved portions 20A. Furthermore, extension portions (not shown in the drawings) that extend toward the curved portion 20A sides of the bumper reinforcement 20 and are laid on top of the lower walls of the curved portions 20A are disposed on the front end portions 42A of the braces 42, and the extension portions are joined by plural rivets (not shown in the drawings) to the lower walls of the curved portions 20A. That is, the braces 42 are secured to the curved portions 20A in a state in which the curved portions 20A are sandwiched between the upper side extension portions 42C and the lower side extension portions (not shown in the drawings) of the braces 42. Furthermore, a pair of right and left bent portions (not shown in the drawings) that are bent on both vehicle width direction sides may also be disposed on the front end portions 42A of the braces 42 and joined to the sections of the rear surfaces 20C of the curved portions 20A. It should be noted that the braces 42 may also be joined to the curved portions 20A by nuts and bolts or welding, for example, instead of the rivets 44.

As shown in FIG. 3, the rear end portions 42B of the braces 42 each have an outer shape conforming to the shape of the recessed portions 40A of the side rails 14. More specifically, as seen in a plan sectional view, the braces 42 each have a rear side wall portion 42E, which is bent inward in the vehicle width direction from the rear end portion of an outside vertical wall portion 42D and is placed opposing the rear side wall portion 41A of the recessed portion 40A, and an inside wall portion 42F, which is bent toward the vehicle front side from the vehicle width direction inside end portion of the rear side wall portion 42E and is placed opposing the bottom wall portion 41B of the recessed portion 40A. Moreover, the braces 42 each have an inside vertical wall portion 42G that extends in an oblique direction toward the vehicle front side and outward in the vehicle width direction from the front end portion of the inside wall portion 42F. The rear end portion side of the inside vertical wall portion 42G is placed opposing the sloping portion 41C of the recessed portion 40A. Gaps are disposed between the rear side wall portion 42E and the rear side wall portion 41A of the recessed portion 40A, between the inside wall portion 42F and the bottom wall portion 41B of the recessed portion 40A, and between the inside vertical wall portion 42G and the sloping portion 41C of the recessed portion 40A. In the case of a frontal crash (a small overlap crash) where a load is input from the vehicle front end portion to one of the curved portions 20A of the bumper reinforcement 20 at the vehicle width direction outer sides of the side rails 14, because of the shape of the rear end portion 42B of the corresponding brace 42, the rear end portion 42B of the corresponding brace 42 comes into contact with the corresponding recessed portion 40A, and the rear end portion 42B and the recessed portion 40A become engaged with each other.

In the present embodiment, the thickness of the braces 42 is set to a substantially constant thickness heading from the front end portions 42A toward the rear end portions 42B, but the thickness of the braces 42 may also be changed. Furthermore, in the present embodiment, the braces 42 are made of metal such as steel, but the braces 42 may also be made of another material such as resin.

As shown in FIG. 3, bulkheads (bulkhead reinforcements) 46 serving as reinforcement members are disposed inside the side rails 14 in such a way as to be interposed between the load bearing portions 40 and the front side cross member (front cross member) 22. More specifically, as seen in a vehicle plan view, each of the bulkheads 46 is disposed in a position where its vehicle front and rear direction front portion side is coincident along the vehicle width direction with the load bearing portion 40 of the side rail 14. Furthermore, as seen in a vehicle plan view, each of the bulkheads 46 is disposed in a position where its vehicle front and rear direction rear portion side is coincident along the vehicle width direction with the section of the side rail 14 that is joined to the cross member 22. In other words, as seen in a vehicle side view the vehicle front and rear direction front portion side of the bulkhead 46 is coincident with the load bearing portion 40 of the side rail 14, and as seen in a vehicle side view the vehicle front and rear direction rear portion side of the bulkhead 46 is coincident with the section of the side rail 14 that is joined to the cross member 22.

The bulkheads 46 are each formed in a substantially hat shape as seen in a vehicle plan sectional view and are placed in such a way as to open inward in the vehicle width direction. The bulkheads 46 are each equipped with a wall portion 46A, which is formed in a substantially U-shape, and a pair of front and rear flanges 46B and 46C, which are bent in the vehicle front and rear direction from the vehicle width direction inside end portions of the wall portion 46A. The pair of front and rear flanges 46B and 46C are placed in a state in which they are in surface-contact with the inner wall of the side rail inner member 38, and the pair of front and rear flanges 46B and 46C are joined by welding, for example, to the side rail inner member 38. In the present embodiment, the vehicle width direction outside section of the wall portion 46A of the bulkhead 46 is placed with a gap between it and the side rail outer member 36, but the vehicle width direction outside section of the wall portion 46A of the bulkhead 46 may also be placed in contact with the side rail outer member 36.

Because of the bulkheads 46, in a case where a load has been input to one of the curved portions 20A at the vehicle width direction outer sides of the side rails 14 (in the case of a small overlap crash), the corresponding load bearing portion 40 strikes the corresponding bulkhead 46 so that the load is efficiently transmitted to the cross member 22.

Next, the action and effects of the vehicle frame structure S10 of the present embodiment will be described.

As shown in FIG. 1, in the vehicle frame structure S10, the pair of right and left side rails 14 that extend along the vehicle front and rear direction are disposed at the vehicle width direction outer sides, and the cross member 22 bridges the pair of right and left side rails 14 in the vehicle width direction. The load bearing portions 40 are disposed at the vehicle width direction outer side surfaces of the side rails 14 in the joint sections between the side rails 14 and the cross members 22. In the present embodiment, the load bearing portions 40 are configured by the recessed portions 40A that are recessed inward in the vehicle width direction from the vertical wall portions 36A of the side rail outer members 36 (see FIG. 3). The bumper reinforcement 20 that extends in the vehicle width direction is placed on the front end portion sides of the front portions 14A of the side rails 14. The curved portions 20A that curve toward the vehicle rear side heading outward in the vehicle width direction in the sections of the bumper reinforcement 20 at the vehicle width direction outer sides of the side rails 14 are disposed in the bumper reinforcement 20. The braces 42 are secured to the rear surfaces 20C of the curved portions 20A of the bumper reinforcement 20. The braces 42 project toward the vehicle rear side, and the rear end portions 42B of the braces 42 are placed with a gap between them and the load bearing portions 40.

Figure 4:
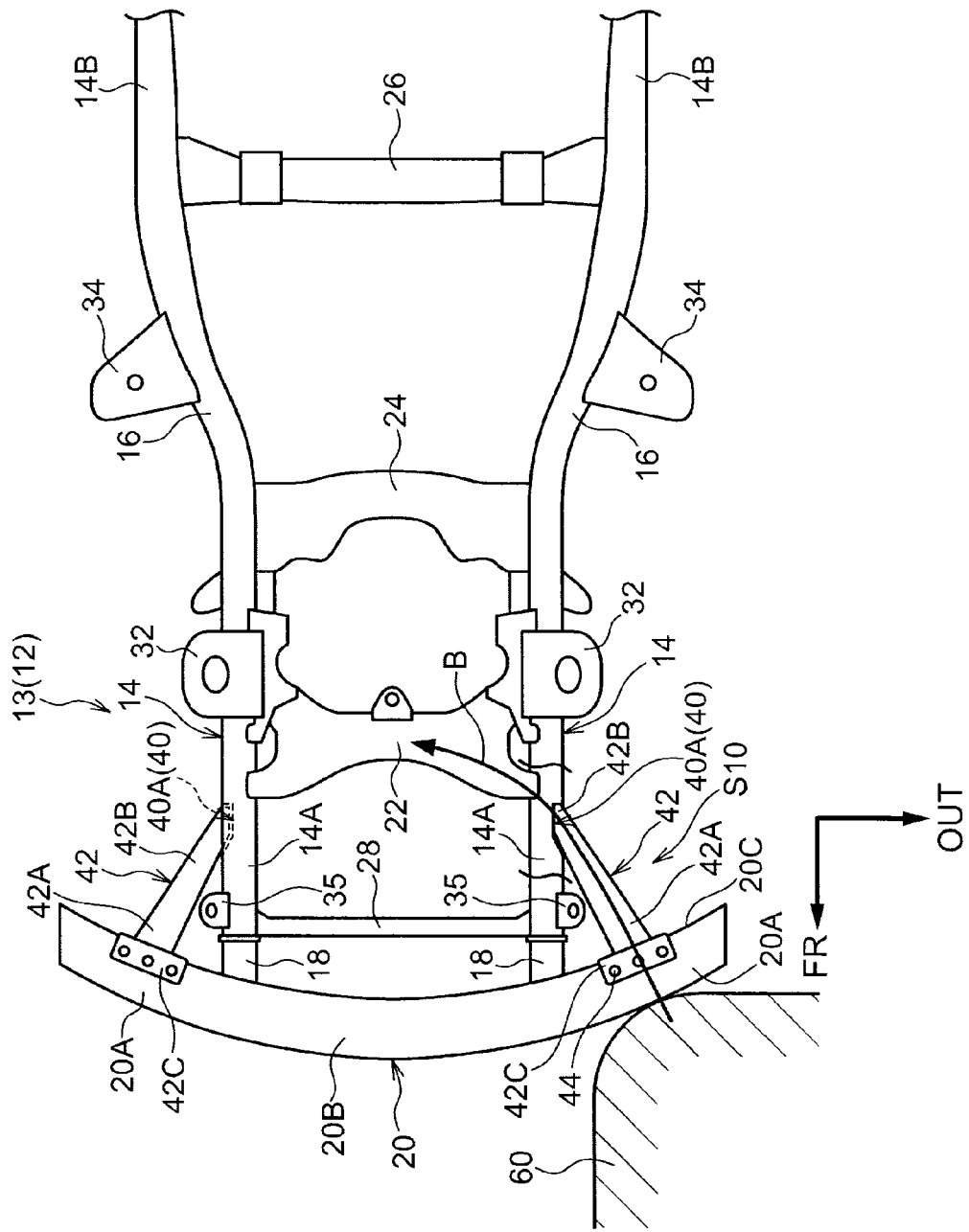
FIG. 4 is a plan view showing a state in which, in the vehicle frame structure shown in FIG. 1, the brace has come into contact with the load bearing portion in a case where a load from a vehicle front end portion has been input to a curved portion at the vehicle width direction outer side of the side rail.

FIG. 4 shows the state of the vehicle frame structure S10 in a case where one of the curved portions 20A of the bumper reinforcement 20 at the vehicle width direction outer sides of the side rails 14 crashes into a barrier 60 located obliquely in front of the vehicle. In the case of a small overlap crash such as this, a reaction force heading obliquely in the rearward direction of the vehicle (see arrow A in FIG. 1) acts from the barrier 60 on that curved portion 20A of the bumper reinforcement 20. That is, as shown in FIG. 4, a load from the vehicle front end portion (the vehicle front) is input to the curved portion 20A at the vehicle width direction outer side of the corresponding side rail 14. At that time, as shown also in FIG. 5, because of the deformation of the curved portion 20A toward the vehicle rear side, the rear end portion 42B of the brace 42 secured to the rear surface 20C of the curved portion 20A comes into contact with the recessed portion 40A configuring the load bearing portion 40, and the rear end portion 42B of the brace 42 and the recessed portion 40A engage (mesh) with each other. Because of this, as indicated by arrow B in FIG. 4, the load is effectively transmitted from the side rail 14 in which that load bearing portion 40 is disposed via the cross member 22 to the side rail 14 on the opposite side in the vehicle width direction.

Figure 5:
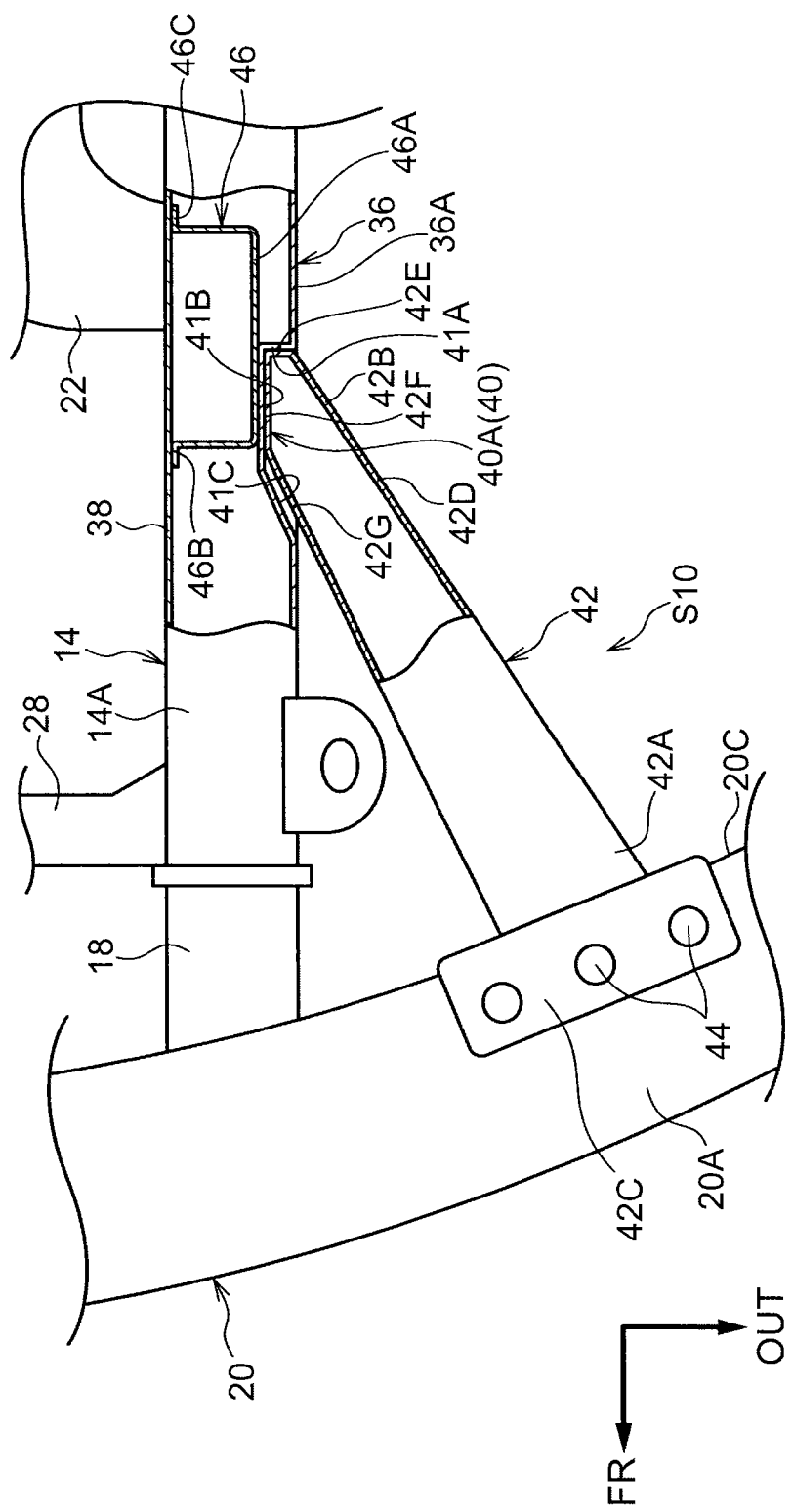
FIG. 5 is a partially cut out, enlarged plan sectional view showing a state in which the brace has come into contact with the load bearing portion in the vehicle frame structure shown in FIG. 4.

At that time, as shown in FIG. 5, because the bulkhead 46 interposed between the load bearing portion 40 and the cross member 22 is disposed inside the side rail 14, the load bearing portion 40 on the crash side strikes the corresponding bulkhead 46 and the load is transmitted from the load bearing portion 40 by the bulkhead 46 to the cross member 22. For this reason, the load from the brace 42 is efficiently transmitted to the side rail 14 on the opposite side in the vehicle width direction.

Because of this, at the time of a small overlap crash, a lateral force can be efficiently produced from the brace 42 via the cross member 22 to the vehicle 12, and the shock when the vehicle 12 crashes into the barrier 60 can be mitigated. That is, by causing the vehicle 12 to move in a direction in which it slides past the barrier 60, the input to the cab (not shown in the drawings) can be mitigated.

Figure 6:
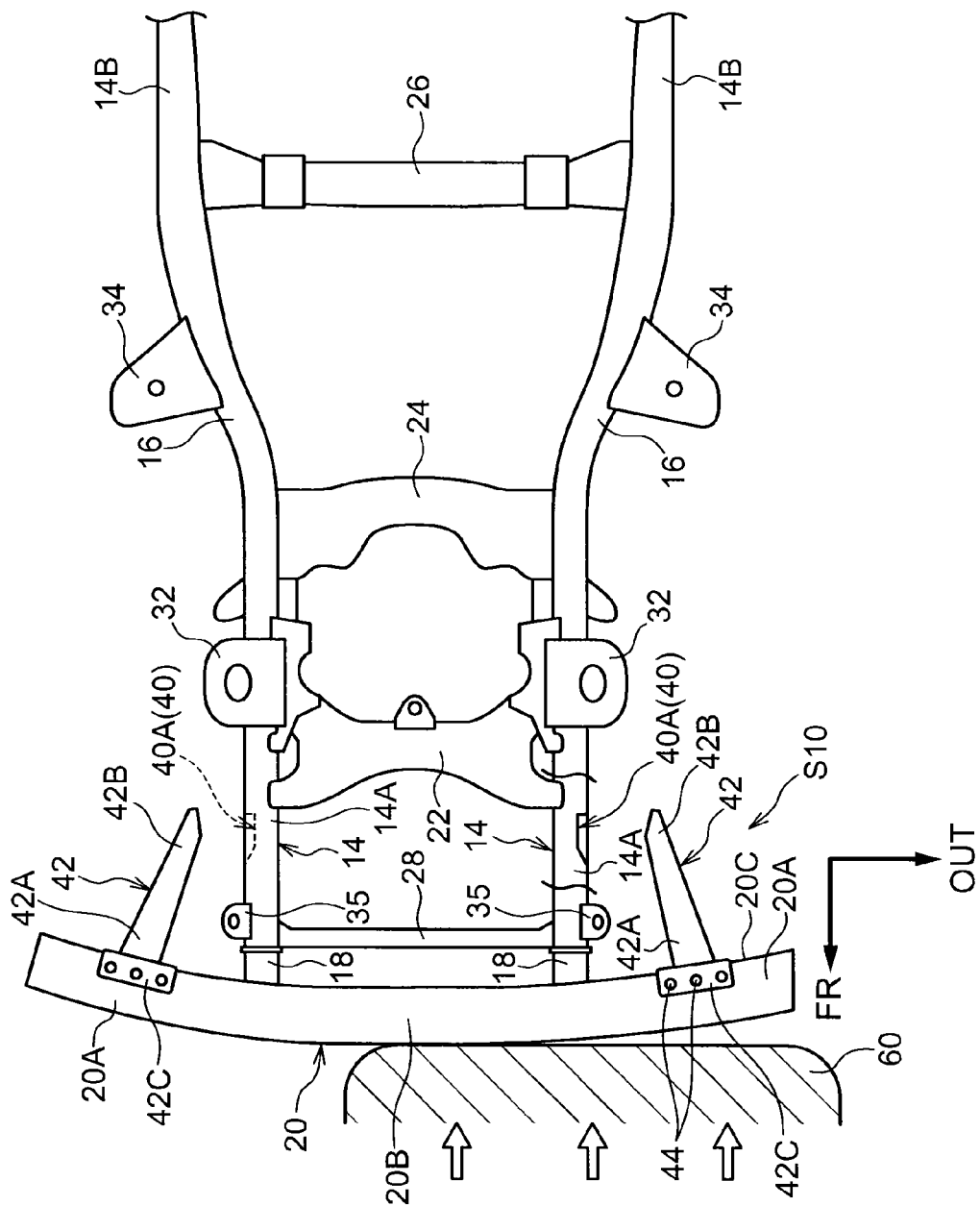
FIG. 6 is a plan view showing a state in which, in the vehicle frame structure shown in FIG. 1, the braces and the load bearing portions do not interfere with each other in a case where a load from the vehicle front end portion has been input to a section of a bumper reinforcement at the vehicle width direction inner side of the side rails.

FIG. 6 shows the state of the vehicle frame structure S10 at the time of a frontal crash where the section of the bumper reinforcement 20 at the vehicle width direction inner side of the side rails 14 crashes into the barrier 60. In this case, a load from the vehicle front end portion (the vehicle front) is input to the section of the bumper reinforcement 20 at the vehicle width direction inner side of the side rails 14. Here, examples of frontal crashes where a load from the vehicle front end portion is input to the section of the bumper reinforcement 20 at the vehicle width direction inner side of the side rails 14 include a crash offset toward the right side or the left side of the front portion 13 of the vehicle 12 (an offset deformable barrier (ODB) crash) and a full overlap crash. FIG. 6 shows the case of a crash offset toward the vehicle width direction right side of the front portion 13 of the vehicle 12 as seen in a vehicle front view.

As shown in FIG. 6, in a case where a load from the vehicle front end portion (the vehicle front) has been input to the section of the bumper reinforcement 20 at the vehicle width direction inner side of the side rails 14, the curved portions 20A become deformed in such a way as to open toward the vehicle front end portion side. That is, the angles formed by the axes of the curved portions 20A with respect to a line along the vehicle width direction after the crash become smaller than the angles formed by the axes of the curved portions 20A with respect to the line along the vehicle width direction before the crash. The curved portions 20A open toward the vehicle front end portion side, so the rear end portions 42B of the braces 42 move outward in the vehicle width direction away from the load bearing portions 40 of the side rails 14. That is, the distance between the rear end portions 42B of the braces 42 and the load bearing portions 40 increases. Because of this, the rear end portions 42B of the braces 42 and the load bearing portions 40 do not interfere with each other (the rear end portions 42B of the braces 42 do not strike the load bearing portions 40), and the front end portion sides of the side rails 14 (in the present embodiment, the front end portions of the side rails 14 and the crash boxes 18) can be made to undergo axial compression deformation. For this reason, the load is absorbed by the front end portion sides of the side rails 14, and the necessary energy absorption performance is ensured so that the amount of deformation of the body (not shown in the drawings) can be controlled.

Consequently, in the vehicle frame structure S10, a balance in crash performance can be achieved between the case of a small overlap crash and the case of a full overlap crash or an offset crash.

In this vehicle frame structure S10, the load bearing portions 40 are configured by the recessed portions 40A that are recessed inward in the vehicle width direction from the vertical wall portions 36A of the side rails 14 (see FIG. 3), and in the case of a small overlap crash, the rear end portion 42B of the brace 42 on the crash side becomes engaged with the corresponding recessed portion 40A. For this reason, the load is easily transmitted to the vehicle rear side of the side rail 14 on the crash side and from that side rail 14 via the cross member 22 to the side rail 14 on the opposite side in the vehicle width direction. Furthermore, the load bearing portions 40 do not project outward in the vehicle width direction from the vertical wall portions 36A of the side rails 14, so they can be kept from affecting the rotational track of the front wheels (not shown in the drawings) in the vehicle width direction as seen in a vehicle plan view.

Moreover, the bulkheads 46 interposed between the load bearing portions 40 and the cross member 22 are disposed inside the side rails 14, so in the case of a small overlap crash, the load bearing portion 40 on the crash side strikes the corresponding bulkhead 46 and the load is transmitted by that bulkhead 46 to the cross member 22. For this reason, the load from the brace 42 can be efficiently transmitted to the side rail 14 on the opposite side in the vehicle width direction.

Here, a vehicle frame structure of a comparative example will be described. The vehicle frame structure of the comparative example is not shown in the drawings but has a configuration where the angles formed by the vehicle width direction outside end portions of the bumper reinforcement with respect to a line along the vehicle width direction as seen in a vehicle plan view are smaller than the angles formed by the curved portions 20A of the bumper reinforcement 20 of the present embodiment (see FIG. 1) with respect to the line along the vehicle width direction. In this vehicle frame structure, in the case of a full overlap crash or an offset crash, the vehicle width direction outside end portions of the bumper reinforcement become deformed in such a way as to open toward the vehicle front end portion side, but the amount of deformation thereof is smaller than it is in the vehicle frame structure S10 of the first embodiment, and there is the potential for the rear end portions of the braces and the load bearing portions to interfere with each other. If the rear end portions of the braces and the load bearing portions interfere with each other, the braces provide bracing, which hinders the axial compression deformation of the front end portion sides of the side rails and makes it difficult to ensure the necessary energy absorption performance. For this reason, there is the potential for the amount of deformation of the body to increase.

In contrast to this, in the vehicle frame structure S10 of the present embodiment, in the case of a full overlap crash or an offset crash, the curved portions 20A of the bumper reinforcement 20 become deformed in such a way as to open toward the vehicle front end portion side, so the rear end portions 42B of the braces 42 and the load bearing portions 40 do not interfere with each other and the load is absorbed by the front end portion sides of the side rails 14. For this reason, in the vehicle frame structure S10, a balance in crash performance can be achieved between the case of a small overlap crash and the case of a full overlap crash or an offset crash.

Next, a vehicle frame structure S90 pertaining to a second embodiment of the present invention will be described. It should be noted that, in the second embodiment, the same reference signs are assigned to constituent elements and members that are the same as those in the first embodiment, and detailed description of those same constituent elements and members will be omitted.

Figure 7:
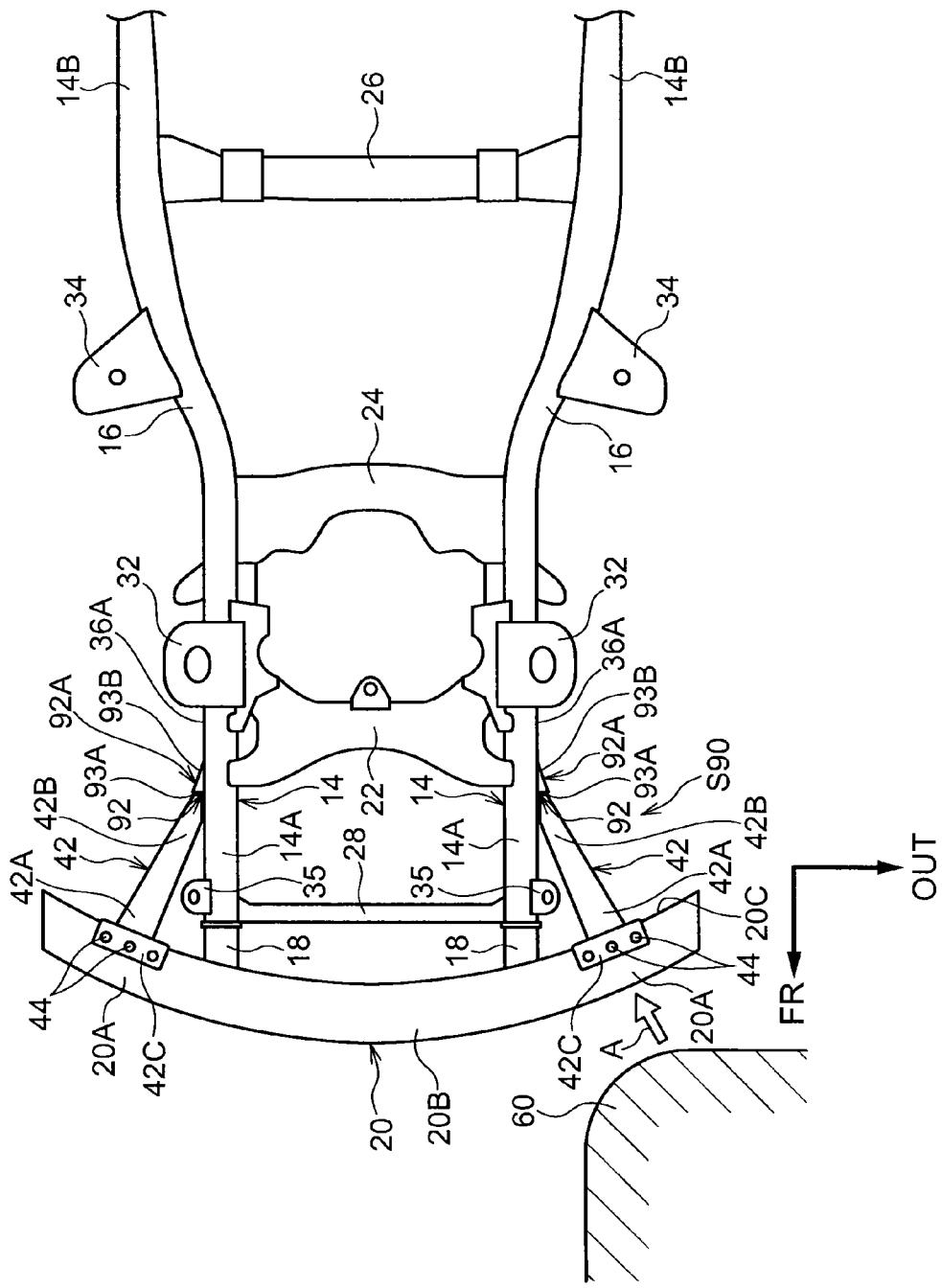
FIG. 7 is a plan view showing a vehicle frame structure pertaining to a second embodiment.

As shown in FIG. 7, in the vehicle frame structure S90 of the present embodiment, load bearing portions 92 are disposed on the vehicle width direction outside vertical wall portions 36A of the side rails 14. The load bearing portions 92 are equipped with raised portions 92A that project outward in the vehicle width direction from the vertical wall portions 36A. The raised portions 92A are equipped with front wall portions 93A, which extend outward in the vehicle width direction from the vertical wall portions 36A, and sloping portions 93B, which slope in an oblique direction toward the vehicle rear side and inward in the vehicle width direction from the vehicle width direction outside end portions of the front wall portions 93A. The rear end portions 42B of the braces 42 are placed with a gap between them and the front wall portions 93A and are placed with a gap between them and the vertical wall portions 36A on the front sides of the front wall portions 93A. Furthermore, although they are not shown in the drawings, bulkheads are disposed inside the side rails 14 in the positions where the load bearing portions 92 are disposed.

In this vehicle frame structure S90, although it is not shown in the drawings, in the case of a small overlap crash, the rear end portion 42B of the brace 42 on the crash side that is secured to the rear surface 20C of the corresponding curved portion 20A of the bumper reinforcement 20 comes into contact with the front wall portion 93A of the load bearing portion 92 and the vertical wall portion 36A, and the rear end portion 42B of the brace 42 engages (meshes) with the area around the corner portion between the front wall portion 93A and the vertical wall portion 36A. Because of this, the load is efficiently transmitted from the side rail 14 on which that load bearing portion 92 is disposed via the cross member 22 to the side rail 14 on the opposite side in the vehicle width direction.

Figure 8:
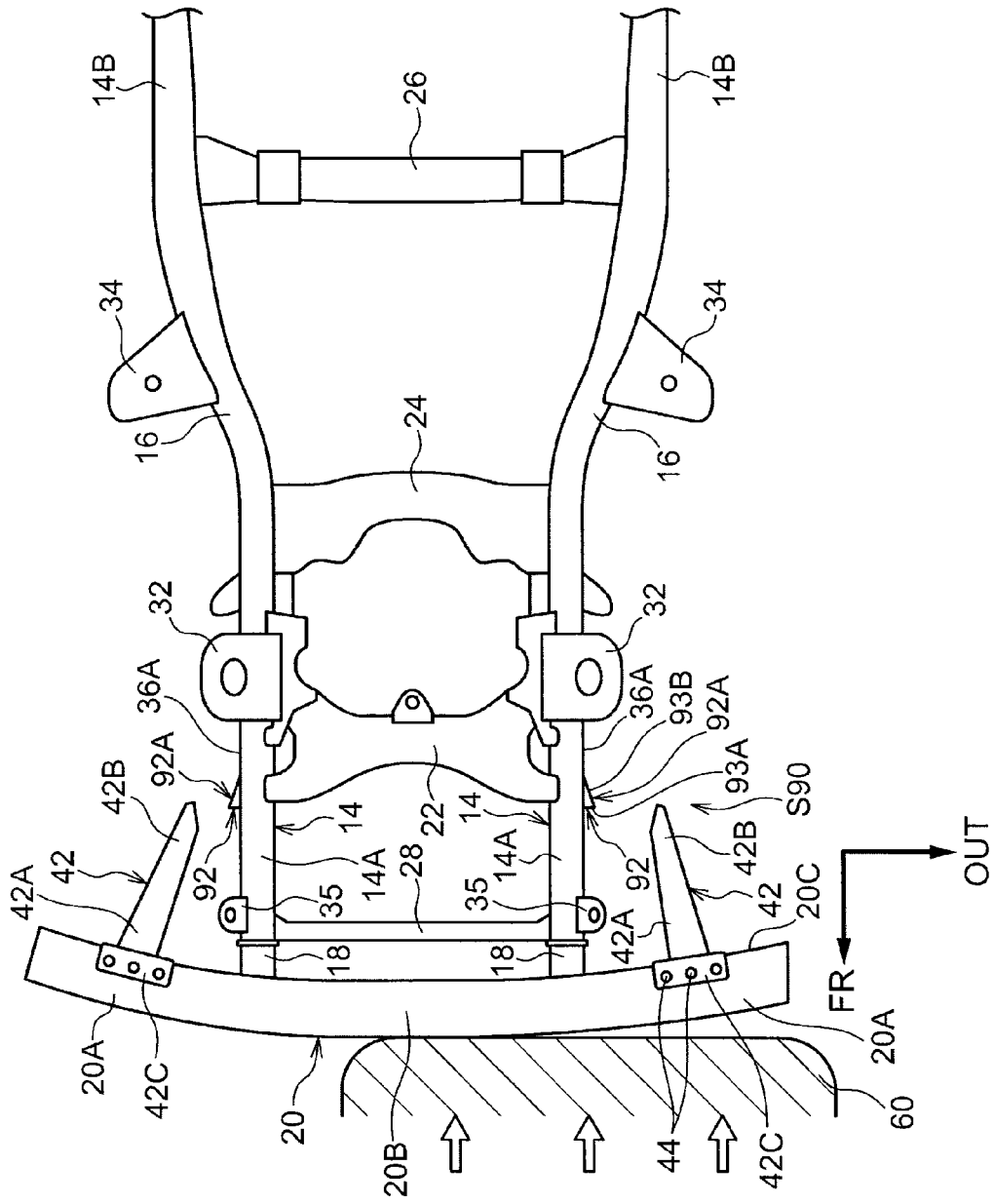
FIG. 8 is a plan view showing a state in which, in the vehicle frame structure shown in FIG. 7, the braces and load bearing portions do not interfere with each other in a case where a load from the vehicle front end portion has been input to the section of the bumper reinforcement at the vehicle width direction inner side of the side rails.

Furthermore, as shown in FIG. 8, in the case of a frontal crash (e.g., a full overlap crash or an offset crash) where a load from the vehicle front end portion is input to the section of the bumper reinforcement 20 at the vehicle width direction inner side of the side rails 14, the curved portions 20A become deformed in such a way as to open toward the vehicle front end portion side. Because of this, the rear end portions 42B of the braces 42 move away from the load bearing portions 92 of the side rails 14, so the rear end portions 42B of the braces 42 and the load bearing portions 92 do not interfere with each other, and the front end portion sides of the side rails 14 (in the present embodiment, the front end portions of the side rails 14 and the crash boxes 18) can be made to undergo axial compression deformation. For this reason, the load is absorbed by the front end portion sides of the side rails 14, and the amount of deformation of the body (not shown in the drawings) can be controlled.

Consequently, in the vehicle frame structure S90, a balance in crash performance can be achieved between the case of a small overlap crash and the case of a full overlap crash or an offset crash.

It should be noted that the shape of the braces 42 and the shapes of the load bearing portions 40 and 90 in the vehicle frame structure are not limited to the ones in the first and second embodiments and can be changed. In that case, it is preferred that the shapes of the rear end portions of the braces 42 and the load bearing portions be made to conform to each other, so that at the time of a small overlap crash the rear end portions of the braces 42 and the load bearing portions contact and engage with each other.

Furthermore, the configuration by which the braces 42 are secured to the bumper reinforcement 20 in the vehicle frame structure is not limited to the one in the first and second embodiment and can be changed.

Furthermore, in the first and second embodiments, the braces 42 have a cantilever structure and gaps are disposed between the rear end portions 42B of the braces 42 and the load bearing portions 40 and 92, but the present invention is not limited to this configuration and may also have a configuration where temporary joint brackets bridge the gaps between the rear end portions 42B of the braces 42 and the load bearing portions 40 and 92. For example, the present invention may also have a configuration where one end of each of the temporary joint brackets is joined the rear end portions 42B of the braces 42, the other ends of the temporary joint brackets are joined to the areas around the load bearing portions, and the temporary joint brackets become detached at the time of a small overlap crash so that the rear end portions 42B of the braces 42 and the load bearing portions come into contact with each other.

Furthermore, the position, shape, and size of the bulkheads placed inside the side rails 14 between the load bearing portions and the cross member 22 in the vehicle frame structure is not limited to the position, shape, and size of the bulkheads in the first embodiment and can be changed. Furthermore, in the first embodiment, the bulkheads are joined to the side rail inner members 38, but the present invention is not limited to this configuration and may also have a configuration where, for example, the bulkheads are joined to the side rail outer members 36. Furthermore, the vehicle frame structure of the present invention may also have a configuration where reinforcement members such as the bulkheads are not disposed inside the side rails 14 between the load bearing portions and the cross member 22.

The disclosure of Japanese Patent Application No. 2015-155929 filed on Aug. 6, 2015, is incorporated herein by reference.

All documents, patent applications, and technical standards mentioned in this specification are incorporated herein by reference to the same extent as if each individual document, patent application, or technical standard was specifically and individually indicated to be incorporated by reference.

What is claimed is:

1. A vehicle frame structure comprising:
a pair of right and left side rails that are placed at vehicle width direction outer sides and extend along a vehicle front and rear direction;
a cross member that bridges vehicle front portion sides of the pair of right and left side rails in a vehicle width direction;
a bumper reinforcement that is placed at a vehicle front and rear direction front side of the side rails and extends in the vehicle width direction;
load bearing portions that are disposed at vehicle width direction outer side surfaces of the side rails in joint sections between the side rails and the cross member;
curved portions that are disposed at the bumper reinforcement, that curve toward a vehicle rear side heading outward in the vehicle width direction in sections of the bumper reinforcement at the vehicle width direction outer sides of the side rails, and that have a shape which, in a case in which a load from a vehicle front end portion has been input to a section of the bumper reinforcement at a vehicle width direction inner side of the side rails, opens toward a vehicle front end portion side; and
projecting portions that are secured to rear surfaces of the curved portions of the bumper reinforcement, that project toward the vehicle rear side, that are placed with gaps between them and the load bearing portions, and that are configured such that, in a case in which a load from the vehicle front end portion has been input to one of the curved portions at the vehicle width direction outer side of the corresponding side rail, the projecting portion at the side of the one of the curved portion engages with the corresponding load bearing portion,
wherein rear end portions of the projection portions have an outer shape conforming to a shape of the load bearing portions.

2. The vehicle frame structure according to claim 1, wherein the load bearing portions are recessed portions that are recessed inward in the vehicle width direction from vehicle width direction outer side wall portions of the side rails.

3. The vehicle frame structure according to claim 1, wherein the load bearing portions are equipped with raised portions that project outward in the vehicle width direction from vehicle width direction outer side wall portions of the side rails.

4. The vehicle frame structure according to claim 1, wherein reinforcement members interposed between the load bearing portions and the cross member are disposed inside the side rails.

5. The vehicle frame structure according to claim 4, wherein the reinforcement members are joined to side rail inner members configuring vehicle width direction inner side sections of the side rails.

* * * * *